United States Patent
Li et al.

(10) Patent No.: US 10,154,509 B2
(45) Date of Patent: Dec. 11, 2018

(54) GROUP CALL METHOD AND DEVICE

(71) Applicant: HUAWEI TECHNOLOGIES CO., LTD., Shenzhen, Guangdong (CN)

(72) Inventors: Yue Li, Shenzhen (CN); Zhenxing Hu, Beijing (CN); Song Zhu, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 86 days.

(21) Appl. No.: 14/190,863

(22) Filed: Feb. 26, 2014

(65) Prior Publication Data

US 2014/0179293 A1 Jun. 26, 2014

Related U.S. Application Data

(63) Continuation of application No. PCT/CN2012/080786, filed on Aug. 30, 2012.

(30) Foreign Application Priority Data

Aug. 30, 2011 (CN) .......................... 2011 1 0252409

(51) Int. Cl.
*H04W 72/12* (2009.01)
*H04W 4/08* (2009.01)
(Continued)

(52) U.S. Cl.
CPC ........... *H04W 72/121* (2013.01); *H04W 4/08* (2013.01); *H04W 4/16* (2013.01);
(Continued)

(58) Field of Classification Search
CPC ........... H04W 72/121; H04W 72/0413; H04W 76/022; H04W 4/005; H04M 3/56; H04M 2207/18; H04M 2250/62
See application file for complete search history.

(56) References Cited

U.S. PATENT DOCUMENTS

2009/0150118 A1* 6/2009 Naima .................. G01C 22/02
702/165
2009/0181687 A1* 7/2009 Tiirola ................ H04L 27/2613
455/450

(Continued)

FOREIGN PATENT DOCUMENTS

CN 1499851 5/2004
CN 1642054 7/2005
(Continued)

OTHER PUBLICATIONS

Japanese Office Action dated Mar. 31, 2015 in corresponding Japanese Patent Application No. 2014-527484.
(Continued)

*Primary Examiner* — Lester G Kincaid
*Assistant Examiner* — William Y Wang
(74) *Attorney, Agent, or Firm* — Staas & Halsey LLP

(57) ABSTRACT

Embodiments of the present invention provide a group call method and device. The method includes: configuring a group context for a user equipment according to channel resource information or according to network side capability information and channel resource information; sending a message carrying a group call parameter in the group context to the user equipment, where the group call parameter is used to receive a group call message and send a response; sending a group call message to the user equipment according to the group context; and receiving a response, to the group call message, sent by the user equipment according to the group call parameter.

22 Claims, 3 Drawing Sheets

(51) Int. Cl.
*H04W 4/16* (2009.01)
*H04W 72/04* (2009.01)
*H04W 76/12* (2018.01)
*H04W 4/70* (2018.01)

(52) U.S. Cl.
CPC ....... *H04W 72/0413* (2013.01); *H04W 76/12* (2018.02); *H04W 4/70* (2018.02)

(56) References Cited

U.S. PATENT DOCUMENTS

| | | | |
|---|---|---|---|
| 2009/0204862 A1* | 8/2009 | Chun | H04L 1/1822 714/748 |
| 2009/0259910 A1* | 10/2009 | Lee | H04L 1/1877 714/748 |
| 2010/0184444 A1* | 7/2010 | Suo | H04W 72/1289 455/450 |
| 2010/0208597 A1* | 8/2010 | Chun | H04W 74/002 370/252 |
| 2011/0013542 A1* | 1/2011 | Yu | H04W 74/006 370/436 |
| 2011/0164587 A1* | 7/2011 | Seo | H04L 1/1671 370/329 |
| 2011/0268047 A1* | 11/2011 | Nath | H04W 4/08 370/329 |
| 2011/0274040 A1* | 11/2011 | Pani | H04W 4/70 370/328 |
| 2012/0004003 A1* | 1/2012 | Shaheen | H04W 4/08 455/509 |
| 2012/0033613 A1* | 2/2012 | Lin | H04W 74/085 370/328 |
| 2012/0040700 A1 | 2/2012 | Gomes et al. | |
| 2012/0302240 A1* | 11/2012 | Tamaki | H04W 36/0011 455/436 |
| 2013/0136072 A1 | 5/2013 | Bachmann et al. | |
| 2013/0203450 A1 | 8/2013 | Mochizuki et al. | |
| 2014/0135044 A1 | 5/2014 | Bergqvist et al. | |
| 2015/0023244 A1 | 1/2015 | Shaheen et al. | |

FOREIGN PATENT DOCUMENTS

| | | |
|---|---|---|
| CN | 101841911 A | 9/2010 |
| CN | 102075872 | 5/2011 |
| CN | 102083128 | 6/2011 |
| CN | 102118859 A | 7/2011 |
| CN | 102137337 | 7/2011 |
| JP | 2010-520699 | 6/2010 |
| JP | 2013-509800 | 3/2013 |
| JP | 2013-515453 | 5/2013 |
| JP | 2013-520097 | 5/2013 |
| JP | 2013-520103 | 5/2013 |
| JP | 2013-524563 | 6/2013 |
| WO | 2004/043023 | 5/2004 |
| WO | 2008/120925 A1 | 10/2008 |
| WO | 2011/025825 | 3/2011 |
| WO | 2011/087826 A1 | 7/2011 |
| WO | 2011/100596 A2 | 8/2011 |
| WO | 2012/043524 A1 | 4/2012 |

OTHER PUBLICATIONS

Huawei, HiSilicon, "Grouping of MTC devices", 3GPP TSG-RAN WG2 Meeting #74, Barcelona, Spain, May 2011, pp. 1-4.
International Search Report dated Oct. 26, 2012 in corresponding International Application No. PCT/CN2012/080786.
PCT International Search Report and Written Opinion of the International Searching Authority dated Oct. 26, 2012 in corresponding International Patent Application No. PCT/CN2012/080786.
Chinese Search Report dated Aug. 6, 2014, in corresponding Chinese Patent Application No. 2011102524099.
Chinese Office Action dated Aug. 15, 2014, in corresponding Chinese Patent Application No. 201110252409.9.
Japanese Notice of Allowance dated Dec. 15, 2015 in corresponding Japanese Patent Application No. 2014-527484.

* cited by examiner

GROUP CALL METHOD AND DEVICE

CROSS-REFERENCE TO RELATED APPLICATION

This application is a continuation of International Application No. PCT/CN2012/080786, filed on Aug. 30, 2012, which claims priority to Chinese Patent Application No. 201110252409.9, filed on Aug. 30, 2011, both of which are hereby incorporated by reference in their entireties.

TECHNICAL FIELD

The present invention relates to the field of radio communications technologies, and in particular, to a group call method and device.

BACKGROUND

The Internet of Things, briefly referred to as M2M (Machine to Machine, which may be further understood as Machine to Man, Man to Machine, Machine to Mobile in a broad sense), refers to connecting all things with the Internet through an information sensing device, thereby implementing intelligent identification and management.

The information sensing device applied to the Internet of Things includes a radio-frequency identification apparatus, an infrared sensor, a global positioning system, a laser scanner, and so on. The apparatuses are combined with the Internet, and can implement remote perception and control for all the things, thereby generating a more intelligent production and living system. The M2M is huger than the existing Internet, and is widely used in multiple fields such as intelligent transportation, environmental protection, government work, public security, smart home, intelligent fire protection, industrial monitoring, elderly care, and personal health.

However, with the development of communications technologies, the number of M2M devices will become very large. These devices may be closely combined with radio communications technologies and obtain data through radio connection or report data to a control center, and may randomly report or periodically report mass data, thereby causing a great impact on the network, even resulting in network congestion and even paralysis.

In the application scenario of the M2M, mobility of a terminal device, for example, a radio water meter or a radio electricity meter, is low, and generally, it is required that all terminal devices periodically report data. Regarding this type of application requirement, a current communications system generally performs corresponding operations in one-by-one manner. Therefore, each time data is reported, all the terminal devices need to execute a complete signaling flow similar to that of a current mobile phone terminal, and data is sent through scheduling. Since the terminal devices are huge in the number, this manner leads to a large signaling interaction amount, and even leads to signaling overload (Signaling overload). Further, this manner undoubtedly causes a great waste of system resources.

SUMMARY

Embodiments of the present invention provide a group call method and device, which can solve problems that a signaling flow is excessively complex when large-scale M2M devices periodically report and that a success probability of collision-based random access is low.

According to one aspect, a group call method is provided, which includes: configuring a group context for a user equipment according to channel resource information or according to network side capability information and channel resource information; sending a message carrying a group call parameter in the group context to the user equipment, where the group call parameter is used to receive a group call message and send a response; sending a group call message to the user equipment according to the group context; and receiving a response, to the group call message, sent by the user equipment according to the group call parameter, where the channel resource information includes sending resource information, configured by a base station for the user equipment, of an uplink channel quality detecting signal, and the network side capability information includes the number of dynamically scheduled user equipments processed by the base station.

According to another aspect, a group call method is provided, which includes: receiving a message sent by a base station and carrying a group call parameter in a group context that is used to receive a group call message and send a response, where the group context is configured according to channel resource information or according to network side capability information and channel resource information, the channel resource information includes sending resource information, configured by the base station for the user equipment, of an uplink channel quality detecting signal, and the network side capability information includes the number of dynamically scheduled user equipments processed by the base station; storing the group call parameter, and still retaining the group call parameter in an idle state; and receiving, according to the stored group call parameter, the group call message sent by the base station, and sending a response to the group call message to the base station.

According to another aspect, a group call device is provided, which includes: a configuration module, adapted to configure a group context for a user equipment according to channel resource information or according to network side capability information and channel resource information; and a transceiver module, adapted to send a message carrying a group call parameter in the group context configured by the configuration module to the user equipment, where the group call parameter is used to receive a group call message and send a response; where the transceiver module is further adapted to send a group call message to the user equipment according to the group context configured by the configuration module; and the transceiver module is further adapted to receive a response, to the group call message, sent by the user equipment according to the group call parameter configured by the configuration module, where the channel resource information includes sending resource information, configured by the device for the user equipment, of an uplink channel quality detecting signal, and the network side capability information includes the number that the configuration module processes dynamic scheduled user equipments.

According to another aspect, a group call device is provided, which includes: a transceiver module, adapted to receive a message sent by a base station and carrying a group call parameter in a group context that is used to receive a group call message and send a response, where the group context is configured according to channel resource information or according to network side capability information and channel resource information, the channel resource information includes sending resource information, configured by the base station, of an uplink channel quality detecting signal, and the network side capability information includes the number of dynamically scheduled user equipments processed by the base station; a storage module, adapted to store the group call parameter; and a processing module, adapted to still retain the group call parameter stored by the storage module in an idle state; where the transceiver module is adapted to receive, according to the group call parameter stored by the storage module, the group call message sent by the base station, and send a response to the group call message to the base station.

In the embodiments of the present invention, static resources are configured to be in a unified wakeup manner by using M2M service features, a group context is configured for an M2M user equipment, a base station performs a group call on the user equipment by using the group context, and the user equipment performs ordered access according to a group call parameter in the group context still retained in an idle state, so as to respond to the group call, thereby avoiding collision, saving mass RRC signaling interaction of the user equipment between acquisition of a synchronization message and real data scheduling, saving SRB resources, and reducing the overall delay.

BRIEF DESCRIPTION OF DRAWINGS

To describe the technical solutions in the embodiments of the present invention more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

Figure 1:
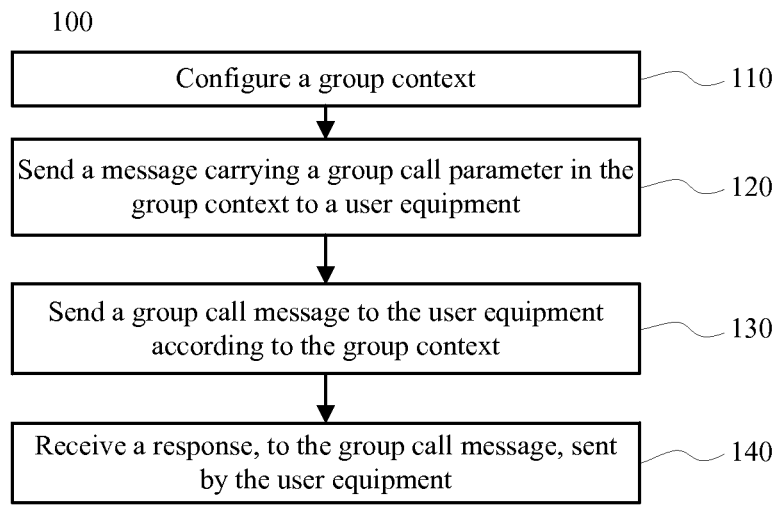
FIG. 1 is a flowchart of a group call method according to an embodiment of the present invention.

The following clearly and describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

The technical solutions of the present invention are applicable to various communications systems, such as a GSM, a code division multiple access (CDMA, Code Division Multiple Access) system, wideband code division multiple access (WCDMA, Wideband Code Division Multiple Access) system, a general packet radio service (GPRS, General Packet Radio Service), and long term evolution (LTE, Long Term Evolution).

A user equipment (UE, User equipment) may also be called a mobile terminal (Mobile Terminal) or a mobile user equipment, and may communicate with one or more core networks through a radio access network (RAN, Radio Access Network). The user equipment may be a mobile terminal, for example, a mobile phone (or called a "cellular" phone) or a computer equipped with a mobile terminal, for example, a portable, pocket-sized, handheld, computer built-in, or vehicle-mounted mobile apparatus, or may also be a low mobility machine type communication (MTC, Machine Type Communication) device, for example, an M2M device, which exchanges a voice and/or data with the radio access network.

A base station may be a base station (NodeB) in WCDMA, or may be an evolved base station (eNB or e-NodeB, evolutional Node B) in LTE, which is not limited in the present invention. However, for ease of description, the following embodiments are described by using the eNB as an example.

In the application scenario of the embodiments of the present invention, switching of the user equipment from an idle (IDLE) state to a connected (connected) state needs many steps, and in an optimal situation, it still takes 80 ms to implement the above steps without regard to situations of contention, congestion, or failure.

For M2M devices, exchanged information during each connection setup hardly changes because of monotonous services, but the information still needs to be sent each time, which is a kind of repetition and waste. In addition, since the M2M devices are huge in the number (there are thousands of devices in a cell), when a service with large-scale simultaneous data report is initiated, the complicated signaling connection process needs to occupy mass SRB (Signaling Radio Bearer, signaling radio bearer) resources, causing cell overload and congestion.

The random access process in the application scenario of the embodiments of the present invention includes the following processes.

1. A user equipment randomly selects a preamble from available preambles (preamble) broadcast in system broadcasting, and sends the preamble to an eNB through a random access channel (RACH).

2. An eNB allocates an uplink sending resource to the user equipment according to the received preamble by using an RAR (Random Access Response, random access response), and notifies that the uplink sending resource is allocated for the user equipment that sends the preamble. Meanwhile, synchronization for the user equipment is completed (TA+ Scheduling Grant).

3. The user equipment that receives the RAR sends an RRC (Radio Resource Control) connection request (RRC Connection Request) according to an indication in the RAR. There is a possibility that multiple user equipments that select the same preamble send the RRC connection request simultaneously on this resource, so that each user equipment randomly generates a conflict resolution serial number, and carries it in its own data.

4. After receiving the RRC connection request, the eNB sends an RRC connection setup message (RRC Connection Setup) to the user equipment, and carries the conflict resolution serial number previously brought by the user equipment in the message. After the user equipment receives the RRC connection setup message, and if the user equipment discovers that the message carries the conflict resolution serial number generated by the user equipment, the user equipment sets up a corresponding RRC connection. Otherwise, the user equipment initiates a new random access process.

Since the selection of a preamble for the random access is based on contention, this manner is inefficient in a situation of high access density. The reason is that, as the number of preambles that are sent simultaneously increases, a decoding success rate of the eNB for a single preamble on a link may be reduced accordingly. Therefore, mass preambles are used, but network access cannot be performed effectively.

In addition, since the preamble is selected through contention, collision cannot be avoided, multiple user equipments simultaneously sending the RRC connection request on a same resource may further reduce receiving accuracy of the above process 3. Further, because of the existence of collision, a conflict resolution process definitely exists, further increasing the delay and resource overhead.

In order to solve the above technical problem, the present invention proposes the following solutions, including:

FIG. 1 is a flowchart of a group call method 100 according to an embodiment of the present invention. A base station in a radio communications system can implement the method 100.

The method 100 shown in FIG. 1 includes:

110: Configure a group context for a user equipment according to channel resource information or according to network side capability information and channel resource information.

The channel resource information may include sending resource information, configured by a base station for the user equipment, of an uplink channel quality detecting signal.

The network side capability information may include the number of dynamically scheduled user equipments processed by the base station.

Since fields of user equipment services are different, and there are differences between sent data, the base station may configure different group contexts for user equipments of different types. A type of the user equipment may be determined through an APN (Access Point Number, access point number), QoS (Quality of Service, quality of service), and/or a machine type communication (MTC, Machine Type Communication) identifier, which is not limited in the embodiments of the present invention.

A common group context is configured for user equipments of a same type according to the channel resource information. At this time, all the user equipments are in one group. Since the number of dynamically scheduled user equipments processed by the base station differs because of different network side capabilities of the base station, in order to further avoid congestion or the delay of the user equipment during dynamic scheduling, in another embodiment of the present invention, user equipments of a same type may be grouped again according to the network side capability information.

Table 1 is an example of the group context according to the embodiment of the present invention. Various parameters in the table are examples for ease of description, and the parameters may be defined in different manners in different implementation manners. In addition, different embodiments may include, but not limited to one or more of the shown parameters. A common parameter required for different implementation manners may be obtained by using a combination of different parameters according to definitions of the parameters, which is not limited in the embodiments of the present invention. As long as the embodiments of the present invention can be implemented, various implementation manners shall fall within the protection scope of the present invention.

TABLE 1

| Common radio bearer (RB) information: | Common radio bearer parameter information, a the number of user equipments in each group, the number of continuous pagings of the group, time window length, and/or maximum preamble transmission times | |
|---|---|---|
| First group information table | Group ID 1 | |
| | Intra-group serial number 1 | User equipment ID, start time 1, frequency band 1, exclusive preamble 1, transmission success flag byte, and exclusive uplink channel resource 1 |
| | Intra-group serial number 2 | User equipment ID, start time 2, frequency band 2, exclusive preamble 2, transmission success flag byte, and exclusive uplink channel resource 2 |
| | Intra-group serial number 3 | User equipment ID, start time 3, frequency band 3, exclusive preamble 3, transmission success flag byte, and exclusive uplink channel resource 3 |
| | . . . | |
| Second group information table | Group ID 2 | |
| | Intra-group serial number 1 | User equipment ID, start time 1, frequency band 1, exclusive preamble 1, transmission success flag byte, and exclusive uplink channel resource 1 |
| | Intra-group serial number 2 | User equipment ID, start time 2, frequency band 2, exclusive preamble 2, transmission success flag byte, and exclusive uplink channel resource 2 |
| | Intra-group serial number 3 | User equipment ID, start time 3, frequency band 3, exclusive preamble 3, transmission success flag byte, and exclusive uplink channel resource 3 |
| | . . . | |
| . . . | . . . | |

The group context includes the common radio bearer information (RB, Radio Bearer) and one or more group detail tables corresponding to the common radio bearer information, where the common radio bearer information includes common radio bearer parameter information, a the number of user equipments in each group, the number of continuous pagings of the group, a time window length, and/or maximum preamble transmission times, and is common information of all user equipments. The details are as follows:

The common radio bearer parameter information in the common radio bearer information may include all parameters of RLC (radio link control, Radio Link Control) and MAC (Media Access Control, media access control) layer configuration in the RB configuration, and a specific time frequency resource block of physical layer transmission is not limited.

The time window length specifies duration for each user equipment sending an exclusive preamble on a dedicated time frequency resource.

The maximum preamble transmission times are maximum transmission times that each user equipment is allowed to send the exclusive preamble on the dedicated time frequency resource.

The time window length is applicable to a situation of continuously sending the exclusive preamble, and the maximum preamble transmission times are applicable to a situation of periodically sending the exclusive preamble. The specific usage may be determined according to initial configuration.

The number of user equipments in each group is the number of user equipments allowed in each group after the user equipments are grouped by a network side according to limitation of a dynamic scheduling processing capability of the eNB and the channel resource information. The eNB needs the information for grouping the user equipments to limit a group size.

The group detail table is an exclusive parameter of each user equipment, and may include a group ID, a user equipment ID, an intra-group serial number, an exclusive preamble transmission time frequency resource, a start time, a frequency band, an exclusive preamble, transmission success flag byte information, and/or exclusive uplink channel (Sounding) resource information.

The group ID in the group detail table is an ID of a group of the user equipments after grouping, and is a common parameter of each user equipment after grouping. The base station uses the group ID to perform a group call.

For particular parts of each user equipment, the meaning of each parameter is as follows:

The user equipment ID may be an IMSI (International Mobile Subscriber Identity, international mobile subscriber identity) of each user equipment, and may also be another exclusive static identity TMSI (Temporary Mobile Subscriber Identity, temporary mobile subscriber identity), for example, P-TMSI/S-TMSI/C-RNTI.

The start time is a start time that the user equipment sends the exclusive preamble. This parameter may be shown for direct notification, and may also be obtained through calculation by the user equipment by using the time window length and the intra-group serial number of the user equipment.

The frequency band specifies that the user equipment sends the exclusive preamble on a specific frequency band.

The frequency band and the start time may form an exclusive preamble transmission time frequency resource. In the embodiments of the present invention, the exclusive preamble transmission time frequency resource is shown as a parameter, which is merely an example, and is not limited in the embodiments of the present invention.

The exclusive preamble is exclusive preamble serial information allocated for use for each user equipment in advance, thereby avoiding collision when a randomly selected preamble is sent.

The transmission success flag byte is the information for marking a user equipment which fails in data transmission. For example, data transmission failure may be set to be FALSE (FALSE), data transmission success may be set to be TRUE (TRUE). The transmission success flag byte information may be set to be null initially, and may also be set and updated by the base station in subsequent operations.

The exclusive uplink channel (sounding) resource information is an exclusive uplink channel resource configured for the user equipment in advance. The user equipment sends the exclusive preamble after receiving a group call, and sends an uplink channel detecting reference signal according to a manner configured in advance (the exclusive uplink channel resource information) once the user equipment receives TA again. In order to ensure that a group of user equipments does not collide together when simultaneously sending the uplink channel detecting reference signal, the number of user equipments in one group needs to be decided by the base station according to a condition of the base station and an uplink channel resource. That is to say, uplink channel resources of two user equipments in different groups may collide together. Therefore, it is required that the user equipment can send the uplink channel detecting reference signal only when this group of user equipments is paged, and that the user equipment stops sending the uplink channel detecting reference signal once data transmission is finished or transmission failure is confirmed, so as to release the resource for a user equipment using a same uplink channel resource in this group and other groups.

120: Send a message carrying a group call parameter in the group context to the user equipment, where the group call parameter is used to receive a group call message and send a response.

Based on definitions of the parameters in the context, the group call parameter may include the common radio bearer parameter information, the number of continuous pagings of the group, the group ID, the intra-group serial number, the exclusive preamble, the exclusive preamble transmission time frequency resource, the exclusive uplink channel resource, the time window length, and/or the maximum preamble transmission times in the group context.

130: Send a group call message to the user equipment according to the group context.

The group call message may be sent to user equipments with different group IDs according to the group context.

140: Receive a response, to the group call message, sent by the user equipment according to the group call parameter.

When the group call parameter includes the exclusive preamble transmission time frequency resource, the exclusive preamble, the exclusive uplink channel resource, and the common radio bearer parameter information, the exclusive preamble sent by the user equipment by using the exclusive preamble transmission time frequency resource is received. A message carrying synchronization information is sent to the user equipment according to the received exclusive preamble. The uplink channel detecting reference signal sent by the user equipment according to the synchronization information and the exclusive uplink channel resource is received. Scheduling signaling is sent to the user equipment according to the uplink channel detecting reference signal. Data sent by the user equipment according to the scheduling signaling and the common radio bearer parameter information is received.

Based on the above technical solution, the embodiment of the present invention proposes configuring static resources to be in a unified wakeup manner by using M2M service features, a group context is configured for an M2M user equipment, a base station performs a group call on the user equipment by using the group context, and the user equipment performs ordered access according to a group call parameter in the group context still retained in an idle state, so as to respond to the group call, thereby avoiding collision, saving mass RRC signaling interaction of the user equipment between acquisition of a synchronization message and real data scheduling, saving SRB resources, and reducing the overall delay.

Figure 2:
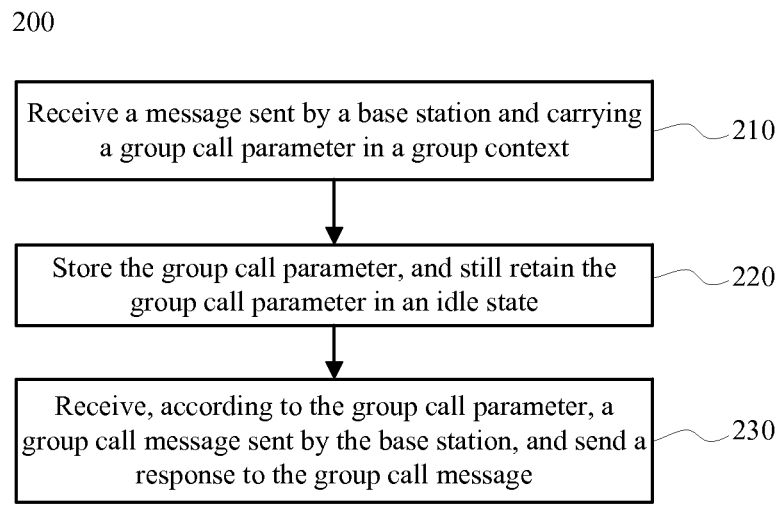
FIG. 2 is a flowchart of another group call method according to an embodiment of the present invention.

FIG. 2 is a flowchart of another group call method 200 according to an embodiment of the present invention. A user equipment in a radio communications system can implement the method 200.

The method 200 shown in FIG. 2 includes:

210: Receive a message sent by a base station and carrying a group call parameter in a group context that is used to receive a group call message and send a response, where the group context is configured according to channel resource information or according to network side capability information and channel resource information.

The channel resource information may include sending resource information, configured by the base station for the user equipment, of an uplink channel quality detecting signal.

The network side capability information may include the number of dynamically scheduled user equipments processed by the base station.

Refer to Table 1 for the example of the group context configured by the base station.

220: Store the group call parameter, and still retain the group call parameter in an idle state.

Based on definitions of the parameters in the context, the group call parameter may include the common radio bearer parameter information, the number of continuous pagings of the group, the group ID, the intra-group serial number, the exclusive preamble, the exclusive preamble transmission time frequency resource, the exclusive uplink channel resource, the time window length, and/or the maximum preamble transmission times in the group context. The above parameter is still retained after the user equipment enters the idle state.

230: Receive, according to the stored group call parameter, the group call message sent by the base station, and send a response to the group call message to the base station.

When the group call parameter includes the group ID, the exclusive preamble transmission time frequency resource, the exclusive preamble, the exclusive uplink channel resource, the common radio bearer parameter information, the time window length, and/or the maximum preamble transmission times, firstly, when a group ID carried by the received group call message sent by the base station is the same as the group ID in the stored group call parameter, the exclusive preamble transmission time frequency resource is used to send the exclusive preamble to the base station until a message carrying synchronization information is received, or the time window length is reached, or the maximum preamble transmission times are reached.

The exclusive preamble may be continuously sent or periodically sent in a unit transmission time interval. Usually, a first transmission power is initially a default power, and subsequent powers increase grade by grade. As a different embodiment, the exclusive preamble is sent for the first time by using a power which is decreased by a grade from a stored power recorded when the message is successfully sent last time, and a power recorded when the message is successfully sent this time is stored for use in a next response, thereby saving energy consumption.

After the message carrying the synchronization information sent by the base station according to the received exclusive preamble is received, an uplink channel quality detecting signal is sent to the base station according to the synchronization information and the exclusive uplink channel resource until all data is successfully sent, or the transmission stops when data transmission reaches maximum retransmission times of a hybrid automatic retransmission request HARQ.

Scheduling signaling sent by the base station according to the uplink channel quality detecting signal is received, and data is sent to the base station according to the common radio bearer parameter information.

When the user equipment successfully sends a response, or the message carrying the synchronization information is still not received when the time window length is reached, or data transmission reaches the maximum retransmission times of the hybrid automatic retransmission request HARQ, the user equipment enters the idle state.

Based on the above technical solution, the embodiment of the present invention proposes configuring static resources to be in a unified wakeup manner by using M2M service features, a group context is configured for an M2M user equipment, a base station performs a group call on the user equipment by using the group context, and the user equipment performs ordered access according to a group call parameter in the group context still retained in an idle state, so as to respond to the group call, thereby avoiding collision, saving mass RRC signaling interaction of the user equipment between acquisition of a synchronization message and real data scheduling, saving SRB resources, and reducing the overall delay.

Figure 3:
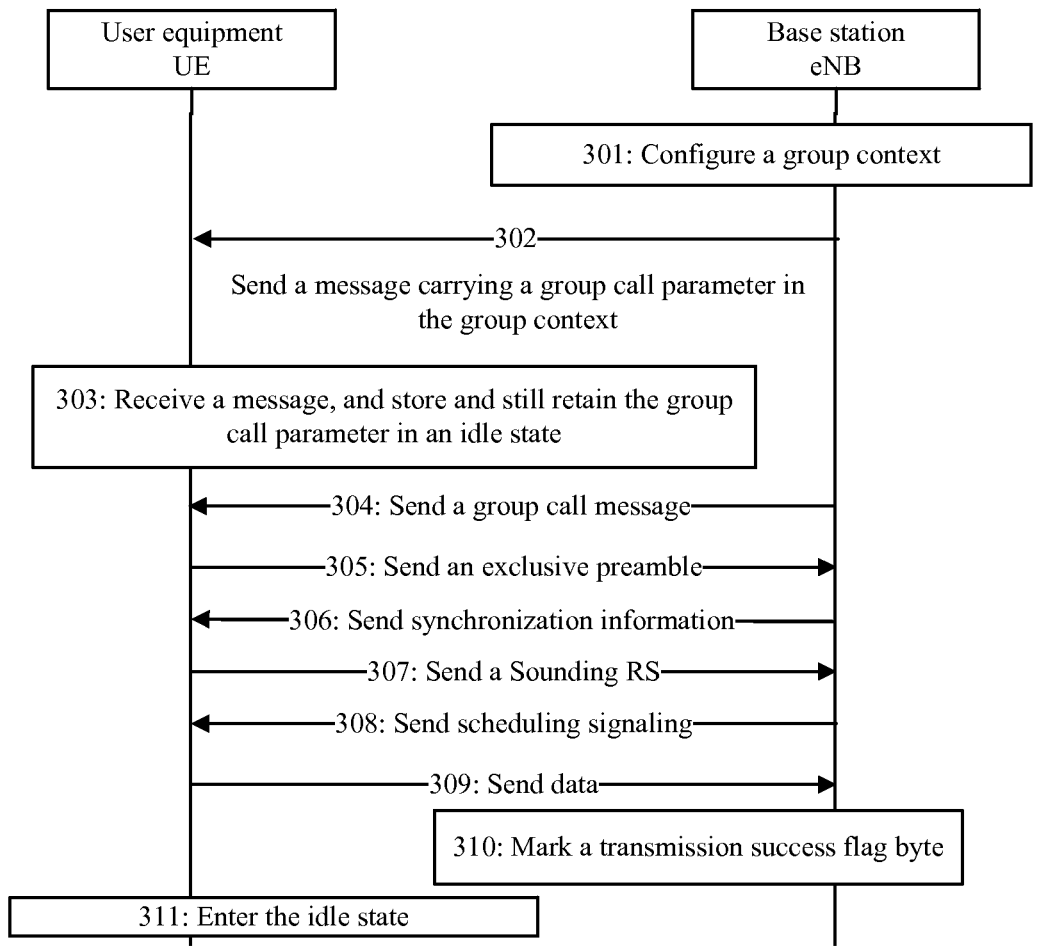
FIG. 3 is a sequence diagram of a group call method according to another embodiment of the present invention.

FIG. 3 is a sequence diagram of a group call method according to an embodiment of the present invention, including:

301: A base station configures a group context for a user equipment according to channel resource information or according to network side capability information and channel resource information.

For example, the base station may configure the group context for MTC user equipments of a same type that are identified through QoS, an APN, and/or an MTC identifier. As a different implementation manner, all user equipments in one group may be re-grouped according to the number of dynamically scheduled user equipments processed by the base station (one type of network side capability information).

Refer to the example of the group context shown in Table 1. Information in the group context includes common information of all user equipments and exclusive information of each user equipment. There is a mapping relationship shown in Table 1 among the information.

302: The base station sends a message carrying a group call parameter in the group context that is used to receive a group call message and send a response to the user equipment.

The group call parameter includes multiple types of information related to time and resource, to apply or calculate time for receiving the group call message and time for sending the response to the group call message. In addition, the resource further includes time frequency resource information, RLC/MAC layer configuration information, and an exclusive preamble, to determine to send the response in order in exclusive time by adopting an exclusive resource.

303: The user equipment receives the message sent by the base station and carrying the group call parameter in the group context that is used to receive a group call message and send a response, stores it, and retains the group call parameter in an idle state.

Since the user equipment still retains the information in the idle state, the user equipment may wake up at a group call time point to receive the group call message.

304: The base station sends a group call message to the user equipment according to the group context at the group call time point.

305: After receiving the group call message, the user equipment acquires its own exclusive preamble transmission time frequency resource and exclusive preamble according to the group call parameter stored previously, and sends the exclusive preamble.

The user equipment continuously sends the exclusive preamble on the exclusive preamble transmission time frequency resource in a unit transmission time interval (TTI) and perform power rising, and transmission does not stop until a random access response (RAR) sent by a network side base station is received or the time window length is reached. As a different implementation manner, an initial value of the transmission power may be a fixed value configured in the group context, or be a value obtained by subtracting a fixed offset from a power value when data is successfully sent finally in last access.

306: The base station receives the exclusive preamble sent by the user equipment, and sends a message (RAR) carrying synchronization information to the user equipment.

307: If the user equipment successfully receives the RAR in a time window length for access, the user equipment determines TA (Timing Advance, transmission time advance) thereby, and the user equipment enters a scheduling queue of the eNB, waits for dynamic scheduling by monitoring a PDCCH (Physical Downlink Control Channel, physical downlink control channel) as that in the prior art, and starts to send a sounding RS (an uplink channel quality detecting signal) according to the group call parameter in the group context that is used to receive a group call message and send a response.

If the RAR is not received when the time window length is reached, the user equipment does not send the sounding RS, and turns to the idle state to wait for a next call. When all data is successfully sent, or data transmission reaches maximum retransmission times of a hybrid automatic retransmission request (HARQ), the user equipment stops sending the sounding RS.

308: The base station receives the sounding RS, and sends scheduling signaling.

The network side can determine, according to the exclusive preamble and the exclusive preamble transmission time frequency resource, which user equipment that performs transmission, places the user equipment in the scheduling queue after feeding back TA for the user equipment, and performs dynamic scheduling according to the sounding RS of the user equipment. Data volumes of user equipments of a same type are the same, and the network side may know that in advance, and may also determine that the user equipment certainly has data for transmission. Therefore, a process of the user equipment sending a scheduling request/buffer state request (SR/BSR, scheduling request/buffer state request) and so on may be omitted, and the data is scheduled directly. If the network side does not know the data volumes, the BSR is necessary.

309: The user equipment sends data after receiving the scheduling signaling.

The user equipment sends the data according to common radio bearer parameter information.

310: If the base station does not detect the exclusive preamble of the user equipment on an exclusive time frequency resource of a specific user equipment, or if data transmission fails, set a transmission failure mark, for example, "FALSE", on a transmission success flag byte of the user equipment.

When a group of user equipments finishes transmission or is marked with "transmission failure", the base station starts to page a next group of devices. After the whole process finishes (transmission for all groups is completed), the user equipment marked with "transmission failure" is called independently according to a traditional process.

In the process where the network side schedules the user equipment, once any data packet of the user equipment is still not accurately transmitted when the maximum HARQ retransmission times are reached, the user equipment is automatically cleared from the scheduling queue, and all user plane caches and flag bytes related to the user equipment are cleared.

When it is confirmed that the user equipment finishes sending all the data and receives the last data packet acknowledgment (ACK) message, the base station may also automatically clear the user equipment from the scheduling queue, and clear all the user plane caches and flag bytes related to the user equipment.

311: When the user equipment succeeds in data transmission, or the message carrying the synchronization information is still not received when the time window length is reached, or data transmission reaches the maximum retransmission times of the hybrid automatic retransmission request (HARQ), the user equipment enters the idle state, and monitors a paging channel again.

When the user equipment finishes sending all the data and receives the last data packet acknowledgment (ACK) message, it is confirmed that the user equipment succeeds in data transmission.

Based on the above technical solution, the embodiment of the present invention proposes configuring static resources to be in a unified wakeup manner by using M2M service features, a group context is configured for an M2M user equipment, a base station performs a group call on the user equipment by using the group context, and the user equipment performs ordered access according to a group call parameter in the group context still retained in an idle state, so as to respond to the group call, thereby avoiding collision, saving mass RRC signaling interaction of the user equipment between acquisition of a synchronization message and real data scheduling, saving SRB resources, and reducing the overall delay.

In 305 of FIG. 3, as another implementation manner, the user equipment may periodically send the exclusive preamble. When the user equipment sends the exclusive preamble, the user equipment does not occupy continuous time frequency resources, but only occupies a fixed number of periodical time frequency resources as a preamble transmission opportunity, and other unoccupied parts are occupied by periodical transmission opportunities of other user equipments.

After finishing transmission of the exclusive preamble, the user equipment receives a corresponding RAR after a fixed time interval. If the RAR is not received, it indicates that the access is not successful yet, and that the exclusive preamble needs to be sent continuously in a next period. If the user equipment receives the RAR successfully in this process, the user equipment determines the TA, stops transmission of the exclusive preamble, and then, monitors the PDCCH, and waits for dynamic scheduling. If the user equipment does not receive the RAR when a certain number of periodical opportunities (the maximum preamble transmission times) is reached, the user equipment enters the idle state, and waits for a next call.

Figure 4:
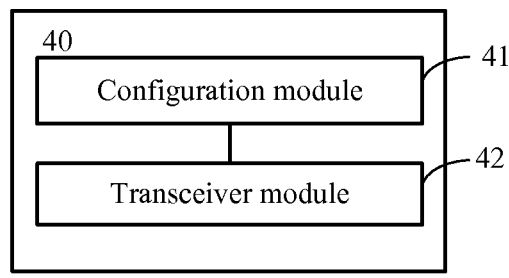
FIG. 4 is a block diagram of a group call device according to an embodiment of the present invention.

FIG. 4 is a block diagram of a group call device 40 according to an embodiment of the present invention, including:

a configuration module 41, adapted to configure a group context for a user equipment according to channel resource information or according to network side capability information and channel resource information; and a transceiver module 42, adapted to send a message carrying a group call parameter in the group context configured by the configuration module to the user equipment, where the group call parameter is used to receive a group call message and send a response, where the transceiver module 42 is further adapted to send a group call message to the user equipment according to the group context configured by the configuration module, and to receive a response, to the group call message, sent by the user equipment according to the group call parameter configured by the configuration module, where the channel resource information includes sending resource information, configured by the device for the user equipment, of an uplink channel quality detecting signal, and the network side capability information includes the number that the configuration module processes dynamic scheduled user equipments.

The device 40 implements the method 100, and specific details are not described again.

Based on the above technical solution, the embodiment of the present invention proposes configuring static resources to be in a unified wakeup manner by using M2M service features, a group context is configured for an M2M user equipment, a base station performs a group call on the user equipment by using the group context, and the user equipment performs ordered access according to a group call parameter in the group context still retained in an idle state, so as to respond to the group call, thereby avoiding collision, saving mass RRC signaling interaction of the user equipment between acquisition of a synchronization message and real data scheduling, saving SRB resources, and reducing the overall delay.

Further, the configuration module 41 is further adapted to configure the group context for the user equipment according to a type of the user equipment.

The configuration module 41 is specifically adapted to determine the type of the user equipment according to an access point number, quality of service, and/or a machine type communication identifier of the user equipment.

The transceiver module 42 is specifically adapted to: when the group call parameter includes an exclusive preamble transmission time frequency resource, an exclusive preamble, an exclusive uplink channel resource, and common radio bearer parameter information, receive the exclusive preamble sent, by using the exclusive preamble transmission time frequency resource, by the user equipment; send a message carrying synchronization information to the user equipment according to the received exclusive preamble; receive the uplink channel quality sounding signal sent, according to the synchronization information and the exclusive uplink channel resource, by the user equipment; send scheduling signaling to the user equipment according to the uplink channel quality detecting signal; and receive data sent, according to the scheduling signaling and the common radio bearer parameter information, by the user equipment.

Figure 5:
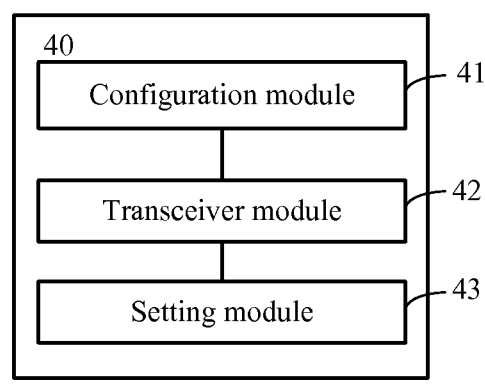
FIG. 5 is a block diagram of a group call device according to another embodiment of the present invention.

As shown in FIG. 5, further, the device 40 further includes:

a setting module 43, adapted to set transmission success flag byte information of the user equipment that fails in data transmission to be FALSE.

The group context configured by the configuration module 41 includes:

common radio bearer information and one or more group information tables corresponding to the common radio bearer information, where the common radio bearer information includes common radio bearer parameter information, a the number of user equipments in each group, the number of continuous pagings of the group, a time window length, and/or maximum preamble transmission times; and the group information table includes a group ID, a user equipment ID, an intra-group serial number, exclusive preamble transmission time frequency resource information, an exclusive preamble, a transmission success flag byte, and an exclusive uplink channel resource.

Figure 6:
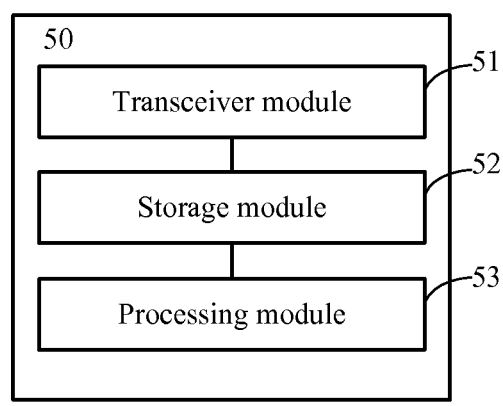
FIG. 6 is a block diagram of another group call device according to an embodiment of the present invention.

FIG. 6 is a block diagram of another group call device 50 according to an embodiment of the present invention, including:

a transceiver module 51, adapted to receive a message sent by a base station and carrying a group call parameter in a group context that is used to receive a group call message and send a response, where the group context is configured according to channel resource information or according to network side capability information and channel resource information, the channel resource information includes sending resource information, configured by the base station, of an uplink channel quality detecting signal, and the network side capability information includes the number of dynamically scheduled user equipments processed by the base station;

a storage module 52, adapted to store the group call parameter received by the transceiver module; and a processing module 53, adapted to still retain the group call parameter stored by the storage module in an idle state, where the transceiver module 51 is adapted to receive, according to the group call parameter stored by the storage module, the group call message sent by the base station, and send a response to the group call message to the base station.

The device 50 implements the method 200, and specific details are not described again.

Based on the above technical solution, the embodiment of the present invention proposes configuring static resources to be in a unified wakeup manner by using M2M service features, a group context is configured for an M2M user equipment, a base station performs a group call on the user equipment by using the group context, and the user equipment performs ordered access according to a group call parameter in the group context still retained in an idle state, so as to respond to the group call, thereby avoiding collision, saving mass RRC signaling interaction of the user equipment between acquisition of a synchronization message and real data scheduling, saving SRB resources, and reducing the overall delay.

The transceiver module 51 is specifically adapted to: when the group call parameter includes a group ID, an exclusive preamble transmission time frequency resource, an exclusive preamble, common radio bearer parameter information, a time window length, and/or maximum preamble transmission times, and a group ID carried by the group call message sent by the base station is the same as the group ID stored by the storage module, send the exclusive preamble to the base station continuously in a unit transmission time interval TTI or periodically until a message carrying synchronization information is received, or the time window length is reached, or the maximum preamble transmission times are reached, where the exclusive preamble uses a time frequency resource sent by the exclusive preamble to send to the base station; send an uplink channel quality detecting signal to the base station according to the synchronization information and the exclusive uplink channel resource until all data is successfully sent, or stop the transmission when data transmission reaches maximum retransmission times of a hybrid automatic retransmission request HARQ; and receive scheduling signaling and the common radio bearer parameter information sent, according to the uplink channel quality detecting signal, by the base station, and send data to the base station.

The transceiver module 51 is specifically adapted to send the exclusive preamble for the first time with a power which is decreased by a grade from a stored power recorded when the message is successfully sent last time, and store a power recorded when the message is successfully sent this time.

Further, the processing module 53 is further adapted to: when the transceiver module succeeds in data transmission, or the message carrying the synchronization information is still not received when the time window length is reached, or data transmission reaches the maximum retransmission times of the hybrid automatic retransmission request HARQ, enable the device to enter the idle state.

The group context received by the transceiver module 51 includes:

common radio bearer information and one or more group information tables corresponding to the common radio bearer information, where the common radio bearer information includes common radio bearer parameter information, a the number of user equipments in each group, the number of continuous pagings of the group, a time window length, and/or maximum preamble transmission times; and the group information table includes a group ID, a user equipment ID, an intra-group serial number, exclusive preamble transmission time frequency resource information, an exclusive preamble, a transmission success flag byte, and an exclusive uplink channel resource.

A person of ordinary skill in the art may be aware that, in combination with the examples described in the embodiments disclosed in this specification, components or units and algorithm steps may be implemented by electronic hardware, or a combination of computer software and electronic hardware. Whether the functions are performed by hardware or software depends on the particular applications and design constraint conditions of the technical solution. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and module, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the module division is merely logical function division and may be other division in actual implementation. For example, a plurality of modules or components may be combined or integrated into another system, or some features may be ignored or not performed. In addition, the displayed or discussed mutual couplings or direct couplings or communication connections may be implemented through some interfaces. The indirect couplings or communication connections between the apparatuses or modules may be implemented in electronic, mechanical, or other forms.

The modules described as separate parts may or may not be physically separate, and the parts displayed as modules may or may not be physical modules, may be located in one position, or may be distributed on a plurality of network modules. Some or all of the components may be selected to achieve the objective of the solution of the embodiment according to actual demands.

In addition, function modules in the embodiments of the present invention may be integrated into a processing module, or each of the modules may exist alone physically, or two or more modules may be integrated into one module.

When the functions are implemented in a form of a software functional module and sold or used as an independent product, the functions may be stored in a computer-readable storage medium. Based on such an understanding, the technical solutions of the present invention essentially, or the part contributing to the prior art, or a part of the technical solutions may be implemented in a form of a software product. The computer software product is stored in a storage medium and includes several instructions for instructing a computer device (which may be a personal computer, a server, a network device, or the like) to perform all or a part of the steps of the methods described in the embodiments of the present invention. The foregoing storage medium includes: any mediums that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A group call method, comprising:
by a base station for a user equipment:
configuring a group context for a group of user equipments according to channel resource information or according to network side capability information and the channel resource information, the group context including different exclusive preambles respectively allocated to different user equipments of the group of user equipments by the base station such that collision of the exclusive preambles within the group of user equipments is avoided;
sending a message carrying a group call parameter in the group context to the user equipment, which is one among the group of user equipments, wherein the group call parameter includes the exclusive preamble allocated to the user equipment and an exclusive preamble transmission time frequency resource, and the group call parameter is used to receive a group call message and send a response;

sending a group call message to the user equipment according to the group context; and receiving a response, to the group call message, sent by the user equipment using the exclusive preamble transmission time frequency resource, the response including the exclusive preamble;

wherein the channel resource information comprises sending resource information, configured by the base station for the user equipment, of an uplink channel quality detecting signal, and the network side capability information comprises the number of dynamically scheduled user equipments processed by the base station.

2. The method according to claim 1, further comprising, prior to the configuring a group context:

determining, by the base station, the group of user equipments by determining that the user equipments to be grouped into the group are of a same type of user equipment.

3. The method according to claim 1, wherein in the determining the group of user equipments, each user equipment of the group of user equipments is determined to be of the same type according to an access point number, a quality of service, and/or a machine type communication identifier of the respective user equipment.

4. The method according to claim 1, wherein the group call parameter further comprises an exclusive uplink channel resource and common radio bearer parameter information, and method further comprises:

sending a message carrying synchronization information to the user equipment according to the received exclusive preamble;

receiving the uplink channel quality detecting signal sent, according to the synchronization information and the exclusive uplink channel resource, by the user equipment;

sending scheduling signaling to the user equipment according to the uplink channel quality detecting signal; and receiving data sent, according to the scheduling signaling and the common radio bearer parameter information, by the user equipment.

5. The method according to claim 4, wherein the method further comprises:

setting transmission success flag byte information of the user equipment that fails in data transmission to be FALSE.

6. The method according to claim 1, wherein the group context comprises:

common radio bearer information and one or more group information tables corresponding to the common radio bearer information, wherein the common radio bearer information comprises common radio bearer parameter information, a number of user equipments in the group, the number of continuous pagings of the group, the number of continuous pagings of the group, a time window length, and/or maximum preamble transmission times;

the group information table comprises a group ID, a user equipment ID, an intra-group serial number, exclusive preamble transmission time frequency resource information, the exclusive preamble, a transmission success flag byte, and an exclusive uplink channel resource; and different exclusive preamble transmission time frequency resources respectively allocated to different user equipments, wherein each of the different exclusive preamble transmission time frequency resources specifies a different respective combination of a start time at which the respective user equipment is to send the exclusive preamble and a frequency band on which the respective user equipment is to send the exclusive preamble; and the exclusive preamble transmission time frequency resource included in the group call parameter is one among the different exclusive preamble transmission time frequency resources.

7. A group call method, comprising:

receiving a message sent by a base station and carrying a group call parameter in a group context that is used to receive a group call message and send a response, wherein the group context is configured, by the base station, according to channel resource information or according to network side capability information and channel resource information, the group context including different exclusive preambles respectively allocated to different user equipments of the group of user equipments by the base station such that collision of the exclusive preambles within the group of user equipments is avoided, the group call parameter includes an exclusive preamble that is one of the allocated exclusive preambles and an exclusive preamble transmission time frequency resource, the channel resource information comprises sending resource information, configured by the base station for a user equipment, of an uplink channel quality detecting signal, and the network side capability information comprises the number of dynamically scheduled user equipments processed by the base station;

storing the group call parameter, and still retaining the group call parameter in an idle state;

receiving, according to the stored group call parameter, the group call message sent by the base station, and sending a response to the group call message to the base station using the exclusive preamble transmission time frequency resource, the response including the exclusive preamble.

8. The method according to claim 7, wherein the group call parameter further comprises a group ID, an exclusive uplink channel resource, common radio bearer parameter information, a time window length, and/or maximum preamble transmission times, and the receiving, according to the stored group call parameter, the group call message sent by the base station, and sending a response to the group call message to the base station comprises:

when a group ID carried by the received group call message sent by the base station is the same as the stored group ID, using the exclusive preamble transmission time frequency resource to send the exclusive preamble to the base station continuously in a unit transmission time interval TTI or periodically until a message carrying synchronization information is received, or the time window length is reached, or the maximum preamble transmission times are reached;

sending an uplink channel quality detecting signal to the base station according to the synchronization information and the exclusive uplink channel resource until all data is successfully sent, or stopping the transmission when data transmission reaches maximum retransmission times of a hybrid automatic retransmission request HARQ; and receiving scheduling signaling and the common radio bearer parameter information sent, according to the uplink channel quality detecting signal, by the base station, and sending data to the base station.

9. The method according to claim 8, wherein the sending the exclusive preamble continuously in a unit transmission time interval TTI or periodically comprises:

sending the exclusive preamble for the first time with a power which is decreased by a grade from a stored power recorded when the message is successfully sent last time, and storing a power recorded when the message is successfully sent this time.

10. The method according to claim 8, wherein the method further comprises:

when the user equipment succeeds in data transmission, or the message carrying the synchronization information is still not received when the time window length is reached, or data transmission reaches the maximum retransmission times of the hybrid automatic retransmission request HARQ, entering, by the user equipment, the idle state.

11. The method according to claim 7, wherein the group context comprises:

common radio bearer information and one or more group information tables corresponding to the common radio bearer information, wherein
the common radio bearer information comprises common radio bearer parameter information, a number of user equipments in the group, the number of continuous pagings of the group, a time window length, and/or maximum preamble transmission times; and
the group information table comprises a group ID, a user equipment ID, an intra-group serial number, exclusive preamble transmission time frequency resource information, the exclusive preamble, a transmission success flag byte, and an exclusive uplink channel resource; and
different exclusive preamble transmission time frequency resources respectively allocated to different user equipments, wherein
each of the different exclusive preamble transmission time frequency resources specifies a different respective combination of a start time at which the respective user equipment is to send the exclusive preamble and a frequency band on which the respective user equipment is to send the exclusive preamble, and
the exclusive preamble transmission time frequency resource included in the group call parameter is one among the different exclusive preamble transmission time frequency resources.

12. A group call device, comprising:

a processor, adapted to configure a group context for a group of user equipments according to channel resource information or according to network side capability information and channel resource information, the group context including different exclusive preambles respectively allocated to different user equipments of the group of user equipments by the processor such that collision of the exclusive preambles within the group of user equipments is avoided; and a transmitter, adapted to send a message carrying a group call parameter in the group context configured by the processor to the user equipment, which is one among the group of user equipments, wherein the group call parameter includes the exclusive preamble allocated to the user equipment and an exclusive preamble transmission time frequency resource, and the group call parameter is used to receive a group call message and send a response, wherein the transmitter is further adapted to send a group call message to the user equipment according to the group context configured by the processor; and the transmitter is further adapted to receive a response, to the group call message, sent by the user equipment using the exclusive preamble transmission time frequency resource, the response including the exclusive preamble;

wherein the channel resource information comprises sending resource information, configured by the device for the user equipment, of an uplink channel quality detecting signal, and the network side capability information comprises the number that the processor processes dynamic scheduled user equipments, and wherein the group call device is part of a base station.

13. The device according to claim 12, wherein to configure the group context, the processor determines that user equipments to be grouped into the group of user equipments are of a same type of user equipment.

14. The device according to claim 13, wherein the processor determines that user equipments to be grouped into the group of user equipments are of a same type of user equipment according to an access point number, quality of service, and/or a machine type communication identifier of the respective user equipment.

15. The device according to claim 12, wherein the transmitter is specifically adapted to, when the group call parameter further comprises an exclusive uplink channel resource, and common radio bearer parameter information:

send a message carrying synchronization information to the user equipment according to the received exclusive preamble;

receive the uplink channel quality detecting signal sent, according to the synchronization information and the exclusive uplink channel resource, by the user equipment;

send scheduling signaling to the user equipment according to the uplink channel quality detecting signal; and receive data sent, according to the scheduling signaling and the common radio bearer parameter information, by the user equipment.

16. The device according to claim 15, wherein the device further comprises:

the processor, adapted to set transmission success flag byte information of the user equipment that fails in data transmission to be FALSE.

17. The device according to claim 12, wherein the group context configured by the processor comprises:

common radio bearer information and one or more group information tables corresponding to the common radio bearer information, wherein
the common radio bearer information comprises common radio bearer parameter information, a number of user equipments in the group, the number of continuous pagings of the group, a time window length, and/or maximum preamble transmission times;

the group information table comprises a group ID, a user equipment ID, an intra-group serial number, exclusive preamble transmission time frequency resource information, an exclusive preamble, a transmission success flag byte, and an exclusive uplink channel resource; and different exclusive preamble transmission time frequency resources respectively allocated to different user equipments, wherein each of the different exclusive preamble transmission time frequency resources specifies a different respective combination of a start time at which the respective user equipment is to send the exclusive preamble and a frequency band on which the respective user equipment is to send the exclusive preamble, and the exclusive preamble transmission time frequency resource included in the group call parameter is one among the different exclusive preamble transmission time frequency resources.

18. A group call device, comprising:

a transmitter, adapted to receive a message sent by a base station and carrying a group call parameter in a group context that is used to receive a group call message and send a response, wherein the group context is configured, by the base station, according to channel resource information or according to network side capability information and channel resource information, the group context including different exclusive preambles respectively allocated to different user equipments of the group of user equipments by the base station such that collision of the exclusive preambles within the group of user equipments is avoided, the group call parameter includes an exclusive preamble that is one of the allocated exclusive preambles and an exclusive preamble transmission time frequency resource, and the group call device is included in a user equipment to which the exclusive preamble has been allocated, the channel resource information comprises sending resource information, configured by the base station, of an uplink channel quality detecting signal, and the network side capability information comprises the number of dynamically scheduled user equipments processed by the base station;

a memory, adapted to store the group call parameter received by the transmitter; and a processor, adapted to still retain the group call parameter stored by the memory in an idle state; wherein the transmitter is adapted to receive, according to the group call parameter stored by the memory, the group call message sent by the base station using the exclusive preamble transmission time frequency resource, and send a response to the group call message to the base station, the response including the exclusive preamble.

19. The device according to claim 18, wherein the transmitter is specifically adapted to, when the group call parameter further comprises a group ID, common radio bearer parameter information, a time window length, and/or maximum preamble transmission times, and a group ID carried by the group call message sent by the base station is the same as the group ID stored by the memory:

send the exclusive preamble to the base station continuously in a unit transmission time interval TTI or periodically until a message carrying synchronization information is received, or the time window length is reached, or the maximum preamble transmission times are reached, wherein the exclusive preamble uses a time frequency resource sent by the exclusive preamble to send to the base station;

send an uplink channel quality detecting signal to the base station according to the synchronization information and the exclusive uplink channel resource until all data is successfully sent, or stop the transmission when data transmission reaches maximum retransmission times of a hybrid automatic retransmission request HARQ; and receive scheduling signaling and the common radio bearer parameter information sent, according to the uplink channel quality detecting signal, by the base station, and send data to the base station.

20. The device according to claim 19, wherein the transmitter is specifically adapted to send the exclusive preamble for the first time with a power which is decreased by a grade from a stored power recorded when the message is successfully sent last time, and store a power recorded when the message is successfully sent this time.

21. The device according to claim 19, wherein the processor is further adapted to: when the transmitter succeeds in data transmission, or the message carrying the synchronization information is still not received when the time window length is reached, or data transmission reaches the maximum retransmission times of the hybrid automatic retransmission request HARQ, enable the device to enter the idle state.

22. The device according to claim 18, wherein the group context received by the transmitter comprises:

common radio bearer information and one or more group information tables corresponding to the common radio bearer information, wherein the common radio bearer information comprises common radio bearer parameter information, a number of user equipments in the group, the number of continuous pagings of the group, a time window length, and/or maximum preamble transmission times;

the group information table comprises a group ID, a user equipment ID, an intra-group serial number, exclusive preamble transmission time frequency resource information, an exclusive preamble, a transmission success flag byte, and an exclusive uplink channel resource; and different exclusive preamble transmission time frequency resources respectively allocated to different user equipments, wherein each of the different exclusive preamble transmission time frequency resources specifies a different respective combination of a start time at which the respective user equipment is to send the exclusive preamble and a frequency band on which the respective user equipment is to send the exclusive preamble, and the exclusive preamble transmission time frequency resource included in the group call parameter is one among the different exclusive preamble transmission time frequency resources.

* * * * *

UNITED STATES PATENT AND TRADEMARK OFFICE
CERTIFICATE OF CORRECTION

PATENT NO. : 10,154,509 B2
APPLICATION NO. : 14/190863
DATED : December 11, 2018
INVENTOR(S) : Yue Li et al.

Page 1 of 1

It is certified that error appears in the above-identified patent and that said Letters Patent is hereby corrected as shown below:

In the Claims

Column 17, Line 31 Claim 4, before "method" insert -- the --.

Signed and Sealed this
First Day of October, 2019

Andrei Iancu
*Director of the United States Patent and Trademark Office*